(12) United States Patent
Partovi

(10) Patent No.: US 10,367,369 B2
(45) Date of Patent: Jul. 30, 2019

(54) SYSTEM AND METHOD FOR CHARGING OR POWERING DEVICES, INCLUDING MOBILE DEVICES, MACHINES OR EQUIPMENT

(71) Applicant: Mojo Mobility, Inc., Santa Clara, CA (US)

(72) Inventor: Afshin Partovi, Palo Alto, CA (US)

(73) Assignee: Mojo Mobility, Inc., Santa Clara, CA (US)

( * ) Notice: Subject to any disclaimer, the term of this patent is extended or adjusted under 35 U.S.C. 154(b) by 0 days.

(21) Appl. No.: 15/650,921

(22) Filed: Jul. 16, 2017

(65) Prior Publication Data

US 2019/0020210 A1 Jan. 17, 2019

(51) Int. Cl.
| | |
|---|---|
| H02J 7/00 | (2006.01) |
| H02J 7/02 | (2016.01) |
| H02J 50/12 | (2016.01) |
| H02J 50/90 | (2016.01) |
| H02J 50/80 | (2016.01) |
| B60L 53/12 | (2019.01) |
| H04B 5/00 | (2006.01) |

(52) U.S. Cl.
CPC .............. *H02J 7/025* (2013.01); *B60L 53/12* (2019.02); *H02J 7/0047* (2013.01); *H02J 50/12* (2016.02); *H02J 50/80* (2016.02); *H02J 50/90* (2016.02); *H02J 2007/0096* (2013.01); *H04B 5/0037* (2013.01)

(58) Field of Classification Search
CPC .. H02J 50/80; H02J 50/90; H02J 50/12; H02J 7/0047; B60L 11/182
USPC .......................................................... 320/108
See application file for complete search history.

(56) References Cited

U.S. PATENT DOCUMENTS

| | | | | |
|---|---|---|---|---|
| 5,619,188 A * | 4/1997 | Ehlers | .................... | G08B 13/08 |
| | | | | 200/61.62 |
| 8,427,101 B2 * | 4/2013 | Saunamaki | ............. | H02J 5/005 |
| | | | | 320/108 |
| 9,577,440 B2 * | 2/2017 | Partovi | .................... | H01F 5/003 |
| 9,722,447 B2 * | 8/2017 | Partovi | .................... | H02J 5/005 |
| 2007/0279002 A1 * | 12/2007 | Partovi | ................. | H02J 7/0027 |
| | | | | 320/115 |
| 2011/0050164 A1 * | 3/2011 | Partovi et al. | .......... | H01F 5/003 |
| | | | | 320/108 |
| 2012/0235636 A1 * | 9/2012 | Partovi | .................... | H02J 7/025 |
| | | | | 320/108 |
| 2013/0119927 A1 * | 5/2013 | Partovi | .................... | H02J 7/025 |
| | | | | 320/108 |
| 2013/0249479 A1 * | 9/2013 | Partovi | .................... | H02J 7/025 |
| | | | | 320/108 |

(Continued)

*Primary Examiner* — Sun J Lin
(74) *Attorney, Agent, or Firm* — Louis Wu

(57) ABSTRACT

In accordance with various embodiments, described herein are systems and methods for enabling efficient wireless power transfer and charging of devices and/or batteries, including in some embodiments freedom of placement of the devices and/or the batteries in one or multiple (e.g. one, two or three) dimensions, and/or improved features including ease of use and compatibility. Exemplary applications include beam inductive or magnetic charging and power for use in, e.g., mobile, electronic, electric, lighting or other devices, machines, batteries, power tools, kitchen, military, medical, industrial tools or systems, robots, trains, buses, trucks and/or vehicles, and other environments.

19 Claims, 8 Drawing Sheets

(56) References Cited

U.S. PATENT DOCUMENTS

| | | | | |
|---|---|---|---|---|
| 2013/0285604 | A1* | 10/2013 | Partovi | H02J 7/0042 320/108 |
| 2014/0132210 | A1* | 5/2014 | Partovi | H02J 5/005 320/108 |
| 2014/0217966 | A1* | 8/2014 | Schneider et al. | H02J 50/12 320/108 |
| 2014/0306654 | A1* | 10/2014 | Partovi | H02J 7/025 320/108 |
| 2015/0102685 | A1* | 4/2015 | Blood et al. | H02J 5/005 307/104 |
| 2016/0068069 | A1* | 3/2016 | Percebon et al. | B60L 11/182 307/104 |

* cited by examiner

130

140

Magnetic flux density in different materials – Sheet steel (1), Silicon steel (2), Cast steel (3), Tungsten steel (4), Magnet steel (5), Cast iron (6), Nickel (7), Cobalt (8), and Magnetite (9) – as a function of the applied magnetic field.

SYSTEM AND METHOD FOR CHARGING OR POWERING DEVICES, INCLUDING MOBILE DEVICES, MACHINES OR EQUIPMENT

CLAIM OF PRIORITY

This continuation-in-part application claims the benefit of priority to U.S. patent application titled "SYSTEM AND METHOD FOR CHARGING OR POWERING DEVICES, SUCH AS ROBOTS, ELECTRIC VEHICLES, OR OTHER MOBILE DEVICES OR EQUIPMENT," application Ser. No. 13/829,786, filed Mar. 14, 2013, which in turn claims priority to U.S. Provisional patent application titled "SYSTEM AND METHOD FOR CHARGING OR POWERING DEVICES, SUCH AS ROBOTS, ELECTRIC VEHICLES, OR OTHER MOBILE DEVICES OR EQUIPMENT," Application No. 61/725,607, filed Nov. 13, 2012, which application is herein incorporated by reference.

CROSS-REFERENCE TO RELATED APPLICATIONS

This application is related to U.S. Patent Publication No. 20120235636 (U.S. patent application Ser. No. 13/352,096) titled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM", filed Jan. 17, 2012, which claims the benefit of priority to U.S. Provisional Patent Application No. 61/433,883, titled "SYSTEM AND METHOD FOR MODULATING THE PHASE AND AMPLITUDE OF AN ELECTROMAGNETIC WAVE IN MULTIPLE DIMENSIONS", filed Jan. 18, 2011; U.S. Provisional Patent Application No. 61/478,020, titled "SYSTEM AND METHOD FOR MODULATING THE PHASE AND AMPLITUDE OF AN ELECTROMAGNETIC WAVE IN MULTIPLE DIMENSIONS", filed Apr. 21, 2011; and U.S. Provisional Patent Application No. 61/546,316, titled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM", filed Oct. 12, 2011; and is also related to U.S. patent application Ser. No. 13/828,789, titled "SYSTEMS AND METHODS FOR WIRELESS POWER TRANSFER", filed Mar. 14, 2013, which claims the benefit of priority to U.S. Provisional patent application titled "SYSTEMS AND METHODS FOR PROVIDING POSITIONING FREEDOM IN THREE DIMENSIONS FOR WIRELESS POWER TRANSFER", Application No. 61/613,792, filed Mar. 21, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems and methods for enabling wireless charging or power supply to one or many receivers placed on or near a wireless charger or power supply.

BACKGROUND

Wireless technologies for powering and charging mobile and other electronic or electric devices, batteries and vehicles have been developed. Such systems generally use a wireless power charger or transmitter, and a wireless power receiver in combination, to provide a means for transfer of power. In some systems, the charger and receiver coil parts of the system are aligned and of comparable or similar size. However, such operation typically requires the user to place the device or battery to be charged in a specific location with respect to the charger. These are the general areas that embodiments of the invention are intended to address.

SUMMARY

Wireless technologies for powering and charging mobile electric or electronic device or system, such as a robot, electric vehicle (EV), bus, train, or other system or battery generally use a wireless power charger or transmitter, and a wireless power receiver in combination, to provide a means for transfer of power across a distance.

For safe and efficient operation of basic wireless charging systems, the charger or transmitter and receiver coils of the system are typically aligned and of comparable or similar size. Such operation typically requires the user to place the device, vehicle or battery to be charged (and hence its receiver) in a specific location with respect to the charger.

In accordance with an embodiment, to enable ease of use, it is desirable that the receiver can be placed on a larger surface area charger, without the need for specific alignment of the position of the receiver. It may also be desirable to be able to charge or power multiple devices of similar or different power and voltage requirements, or operating with different wireless charging protocols, on or near the same charging surface; or to provide some degree of freedom with respect to vertical distance (i.e., away from the surface of the charger) between the charger and the receivers.

An example usage of such a large distance or gap is in charging of devices or systems such as electric vehicles (EV) or buses, electric bicycles or motorcycles, robots, other mobile vehicles and trains. Other examples or use cases include where the charger may need to be physically separated from the device or battery to be charged, such as when a charger is incorporated beneath a surface such as the center console of a car or under the surface of a table or desk, etc.

In accordance with various embodiments, described herein are systems and methods for enabling efficient wireless power transfer and charging of devices and/or batteries, including in some embodiments freedom of placement of the devices and/or batteries in one or multiple (e.g., one, two or three) dimensions, and/or improved features such as ease of use and compatibility. Exemplary applications include inductive or magnetic charging and power for use in, e.g., mobile, electronic, electric, lighting or other devices, batteries, power tools, kitchen, military, medical, industrial tools or systems, robots, trains, buses, electric bicycles or motorcycles, personal mobility (e.g., Segway) devices, trucks and/or vehicles, and other systems or environments.

DETAILED DESCRIPTION

Figure 1:
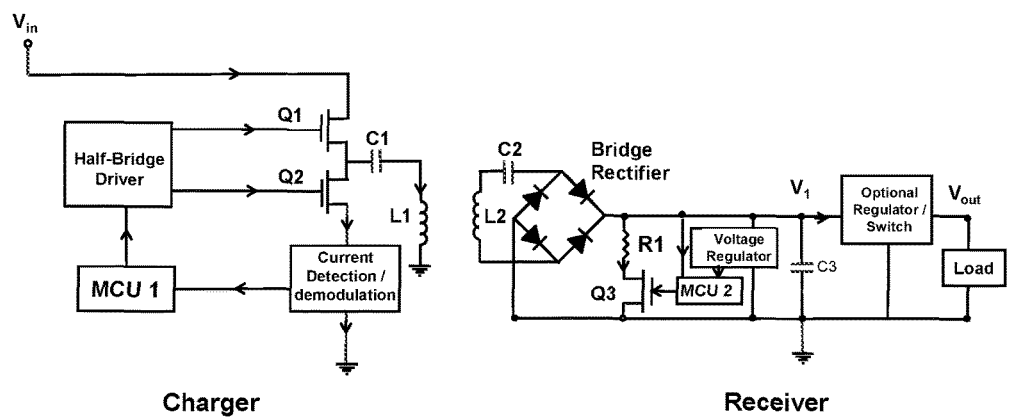
FIG. 1 illustrates a wireless charger or power system comprises a first charger or transmitter part and a second receiver part, in accordance with an embodiment.

With the proliferation of electrical and electronic devices and vehicles (which are considered examples of devices herein), means of providing simple and universal methods of providing power and or charging of these devices are becoming increasingly important.

In accordance with an embodiment, the term device, system, product, or battery is used herein to include any electrical, electronic, mobile, lighting, or other product, batteries, power tools, cleaning, industrial, kitchen, lighting, military, medical, dental or specialized products, trains, vehicles, or movable machines such as robots or mobile machines, whereby the product, part, or component is powered by electricity or an internal or external battery and/or can be powered or charged externally or internally by a generator or solar cell, fuel cell, hand or other mechanical crank or alike. In accordance with an embodiment, a device, system, product, or battery can also include an attachable or integral skin, case, component, battery door or attachable or add-on or dongle type of receiver component to enable the user to power or charge the product or device.

Induction is the generation of electromotive force (EMF) or voltage across a closed electrical path in response to a changing magnetic flux through any surface bounded by that path. Magnetic resonance is a relatively newer term that has been used recently to describe inductive power transfer where the charger and receiver may be far apart or using dissimilar coil sizes or shapes. Since this is in general a form of induction, in the remainder of this document the term induction is used, but the terms induction and magnetic resonance are sometimes used interchangeably herein to indicate that the method of power transfer may be in either domain or a combination thereof.

In accordance with various embodiments, an inductive power transmitter employs a magnetic induction coil(s) transmitting energy to a receiving coil(s) in a device or product, case, battery door, or attachable or add-on component including attachments such as a dongle or a battery inside or outside of device or attached to device through a connector and/or a wire, or stand-alone part placed near the power transmitter platform. The receiver can be an otherwise incomplete device that receives power wirelessly and is intended for installation or attachment in or on the final product, battery or device to be powered or charged, or the receiver can be a complete device intended for connection to a device, product or battery directly by a wire or wirelessly. In addition, the mobile device, system or battery can be stationary or moving during receipt of charge or power.

In accordance with an embodiment, as used herein, the terms wireless power, charger, transmitter or inductive or magnetic resonance power and charger are used interchangeably. In accordance with an embodiment, the wireless charger can be a flat or curved surface or part that can provide energy wirelessly to a receiver. It can also be constructed of flexible materials and/or coils, or even plastic electronics to enable mechanical flexibility and bending or folding to save space or for conformity to non-flat surfaces. The wireless charger can be directly powered by an AC power input, DC power, or other power source, such as a car, motorcycle, truck or other vehicle or airplane or boat or ship power outlet, or vehicle, boat, ship or airplane itself, primary (non-rechargeable), or rechargeable battery, solar cell, fuel cell, mechanical (hand crank, wind, water source, etc.), nuclear source or other or another wireless charger or power supply or a combination thereof. In addition, the wireless charger can be powered by a part such as a rechargeable battery which is itself in turn recharged by another source such as an AC or DC power source, vehicle, boat or ship or airplane outlet or vehicle, boat or ship or airplane itself, solar cell, fuel cell, or mechanical (hand crank, wind, water, etc.) or nuclear source, etc. or a combination thereof. In addition, in cases where the wireless charger is powered by a rechargeable source such as a battery, the battery can also be itself in turn inductively charged by another wireless charger. The wireless charger can be a stand-alone part, device, or product, or can be incorporated into another electric or electronics device or vehicle or airplane or marine vehicle or boat. The wireless charger may also have other functions built in or be constructed such that it is modular and additional capabilities/functions can be added as needed.

In accordance with an embodiment, the product or device to be charged does not necessarily have to be portable and/or contain a battery to take advantage of induction or wireless power transfer. For example, a lighting fixture or an industrial tool or system that is typically powered by an AC outlet or a DC power supply can be placed on or near a wireless charger and receive power wirelessly. The wireless receiver can be a flat or curved surface or part that can receive energy wirelessly from a charger. The receiver and/or the charger can also be constructed of flexible materials and/or coils or even plastic electronics to enable mechanical flexibility and bending or folding to save space or for conformity to non-flat surfaces.

In accordance with various embodiments, devices may contain internal batteries, and the device may or may not be operating during receipt of power. Depending on the degree of charge status of the battery or its presence and the system design, the applied power may provide power to the device, charge its battery or a combination of the above. The terms charging and/or power are used interchangeably herein to indicate that the received power can be used for either of these cases or a combination thereof. In accordance with various embodiments the terms charger, power supply and transmitter are also used interchangeably.

As shown in FIG. 1, in accordance with an embodiment 100, a wireless charger or power system comprises a first charger or transmitter part, and a second receiver part. The charger or transmitter can generate a repetitive power signal pattern (such as a sinusoid or square wave from 10's of Hz to several MHz or even higher, but typically in the 100 kHz to several MHz range) with its coil drive circuit and a coil or antenna for transmission of the power. The power section may comprise one or more switches driven with appropriate pattern by a controller. As an example, a half-bridge driver is shown. However, any other appropriate geometry such as resonant converter, resonant, full bridge, half bridge, E-class, zero voltage or current switching, flyback, or any other appropriate power supply topology can be used.

In accordance with an embodiment, the charger or transmitter also includes a communication and regulation/control system that detects a receiver and/or turns the applied power on or off and/or modify the amount of applied power by mechanisms such as changing the amplitude, frequency or duty cycle, etc., or by a change in the resonant condition by varying the impedance (capacitance or inductance) of the charger or a combination thereof of the applied power signal to the coil or antenna. In accordance with an embodiment, the charger can also be the whole or part of the electronics, coil, shield, or other part of the system required for transmitting power wirelessly. The electronics may comprise discrete components or microelectronics that when used together provide the wireless charger functionality, or comprise an Application Specific Integrated Circuit (ASIC) chip, a multi-chip module (MCM) or chipset that is specifically designed to function as the whole or a substantial part of the electronics for wireless charger system.

In accordance with an embodiment, the second part of the system is a receiver that includes a coil or antenna to receive power, a method for change of the received AC voltage to DC voltage, such as rectification and smoothing with one or more rectifiers or a bridge or synchronous rectifier, etc. and one or more capacitors. In instances where the voltage at the load does not need to be kept within a tight tolerance or can vary regardless of the load resistance or the resistance of the load is always constant, the rectified and smoothed output of the receiver can be directly connected to a load. Examples of this scenario may include lighting applications, or applications where the load is a constant resistance such as a heater or resistor, etc. In these instances, the receiver system could be made simple and inexpensive. In other instances, the resistance or impedance of the load changes during operation. This includes instances where the receiver is connected to a device whose power needs may change during operation or when the receiver is used to charge a battery. In these instances, the output voltage may need to be regulated so that it stays within a range or tolerance during the variety of operating conditions. In these instances, the receiver may optionally include a regulator such as linear, buck, boost or buck boost, etc. regulator and/or switch for the output power. Additionally, the receiver may include a method for the receiver to communicate with the charger.

In accordance with an embodiment, the receiver may optionally include a reactive component (inductor or capacitor) to increase the resonance of the system and a switch to allow switching between a wired and wireless method of charging or powering the product or battery. The receiver may also include optional additional features such as including Near Field Communication, Bluetooth, WiFi, RFID or other communication and/or verification technology.

In accordance with an embodiment, the charger or transmitter coil and the receiver coil can have any shape desired and can be constructed of PCB, wire, Litz wire, metal tubing or a combination thereof. To reduce resistance, the coils can be constructed of multiple tracks or wires in the PCB and/or wire construction or a combination thereof. For PCB construction, the multiple layers can be in different sides of a PCB and/or different layers and layered/designed appropriately to provide optimum field pattern, uniformity, inductance, and/or resistance or Quality factor (Q) for the coil. Various materials can be used for the coil conductor such as different metals and/or magnetic material or plastic conductors, etc. Typically, copper with low resistivity can be used. The design should also take into account the skin effect of the material used at the frequency of operation to preferably provide low resistance.

In accordance with an embodiment, the charger and/or the receivers can incorporate magnetic materials (or a material with permeability that is different than that of air or value of 1) with the coils to provide shielding and/or guiding of flux or magnetic flux switching. These magnetic layers may have different properties depending on their intended purpose and in accordance with an embodiment, one or several of them can be incorporated into the charger and/or receiver to accomplish different goals. In accordance with various embodiments, the magnetic materials, layers or structures used in the charger and or receivers are herein referred to as magnetics of the system.

In accordance with an embodiment, the receiver can be an integral part of a device or battery as described above, or can be an otherwise incomplete device that receives power wirelessly and is intended for installation or attachment in or on the final product, battery or device to be powered or charged, or the receiver can be a complete device intended for connection to a device, product or battery directly by a wire or wirelessly. Examples include replaceable covers, skins, cases, doors, jackets, surfaces, etc or attachable components or systems for devices, vehicles or batteries that can incorporate the receiver or part of the receiver and the received power can be directed to the device or vehicle through connectors in or on the device or battery or the normal wired connector (or power jack) of the device or battery.

In accordance with an embodiment, the receiver may also be a part or device similar to a dongle or cable that can receive power on or near the vicinity of a charger and direct the power to a device, vehicle, system or battery to be charged or powered through a wire and/or appropriate connector. Such a receiver may also have a form factor that allows it to be attached in an inconspicuous manner to the device or vehicle such as a part that is attached to the outer surface at the bottom, front, side, or back side of a system, vehicle, robot, etc or other electronic device and route the received power to the input power/charger connector or jack of the device. The connector of such a receiver can be designed such that it has a pass through or a separate connector integrated into it so that a wire cable for providing wired charging/power or communication can be connected to the connector without removal of the connector thus allowing the receiver and its connector to be permanently or semi-permanently be attached to the device throughout its operation and use. Many other variations of the receiver implementation are possible and these examples are not meant to be exhaustive.

In accordance with an embodiment, the receiver can also be the whole or part of the electronics, coil, shield, or other part of the system required for receiving power wirelessly. The electronics may comprise discrete components or microcontrollers that when used together provide the wireless receiver functionality, or comprise an Application Specific Integrated Circuit (ASIC) chip or chipset that is specifically designed to function as the whole or a substantial part of the electronics for wireless receiver system.

Optional methods of communication between the charger and receiver can be provided through the same coils as used for transfer of power, through a separate coil, through an RF or optical link, through RFID, Bluetooth, WiFi, Wireless USB, NFC, Felica, Zigbee, Wireless Gigabit (WiGig), etc. or through such protocols as defined by the Wireless Power Consortium (WPC), Alliance for Wireless Power (A4WP) or other protocols or standards, developed for wireless power, or other communication protocol specific to a particular application, such as Dedicated Short Range Communications (DSRC) used in vehicle communication, or combination thereof.

While a system for communication between the charger and receiver through the power transfer coil or antenna is described above, in accordance with an embodiment the communication can also be implemented through a separate coil, a radio frequency link (am or fm or other communication method), an optical communication system or a combination of the above. The communication in any of these methods can also be bi-directional rather than uni-directional as described above.

Figure 2:
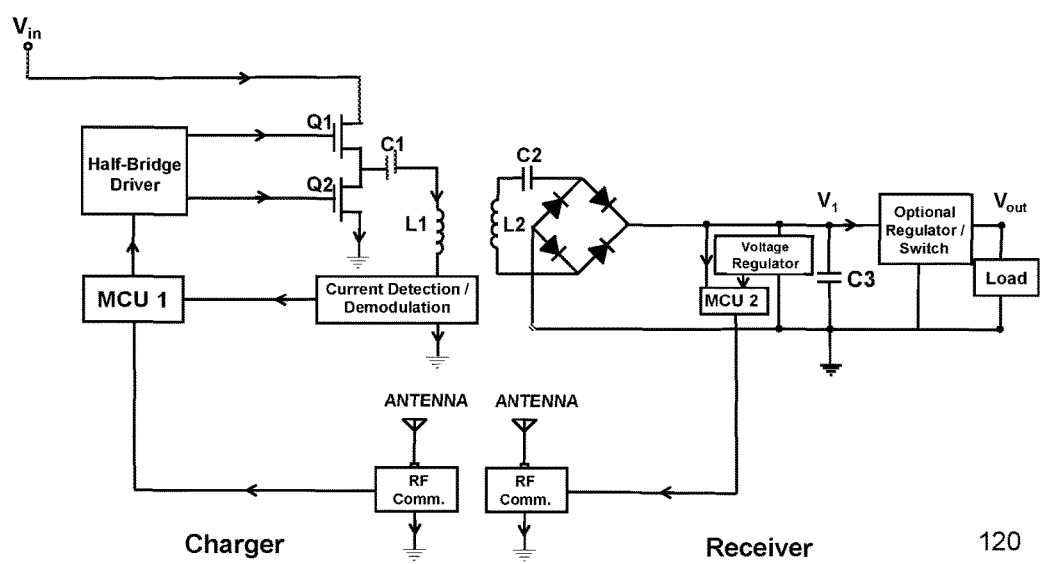
FIG. 2 illustrates a wireless power transfer system in accordance with an embodiment.

As an example, FIG. 2 shows a system 120 in accordance with an embodiment, wherein a dedicated RF channel for uni-directional or bi-directional communication between the charger and receiver is implemented for validation and/or regulation purposes. This system is similar to the system shown in FIG. 1, except rather than load modulation being the method of communication, the MCU in the receiver transmits necessary information over an RF communication path. This RF channel can be any appropriate protocol such as WiFi, wireless Zigbee, Bluetooth, RFID, NFC, or automotive specific protocols such as Dedicated Short Range Communications (DSRC) or any protocol specifically defined for wireless power. A similar system with LED or laser transceivers or detectors and light sources can be implemented. Advantages of such a system include that the power received is not modulated and therefore not wasted during communication and/or that no electronic noise due to the modulation is added to the system.

Figure 3:
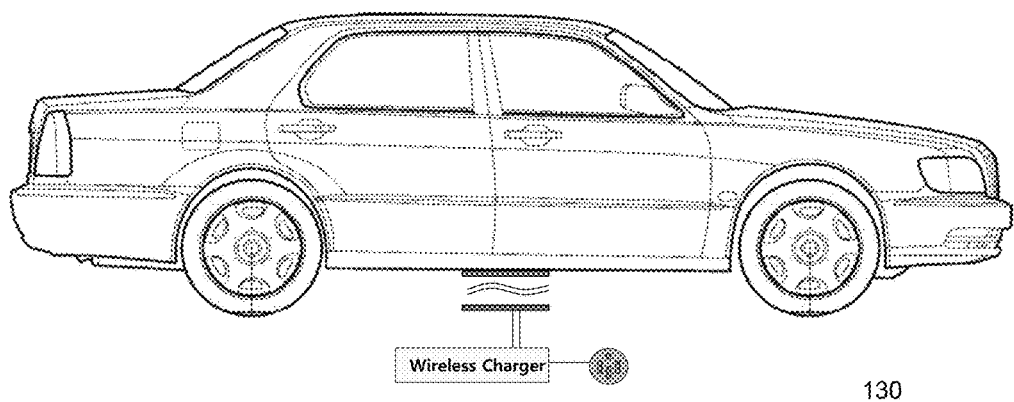
FIG. 3 illustrates a system for wireless charging of electric vehicles, in accordance with an embodiment.

Some implementations of wireless charging for electric vehicles (EVs) use circular transmitter and receiver coils operating in resonance to transfer power between them. An example of such system 130 is shown in FIG. 3. In such systems, the AC magnetic flux (shown 140 in FIG. 4) generated by the charger is mostly vertically oriented and creates a corresponding AC current in the receiver coil to transfer power. In addition, these wireless charging systems typically include magnetic field shielding behind the charger and/or receiver coils. It is particularly important to shield the vehicle and surrounding areas from spurious magnetic fields generated by the transmitter (charger) to avoid interference with electronics and EM related health issues.

Figure 4:
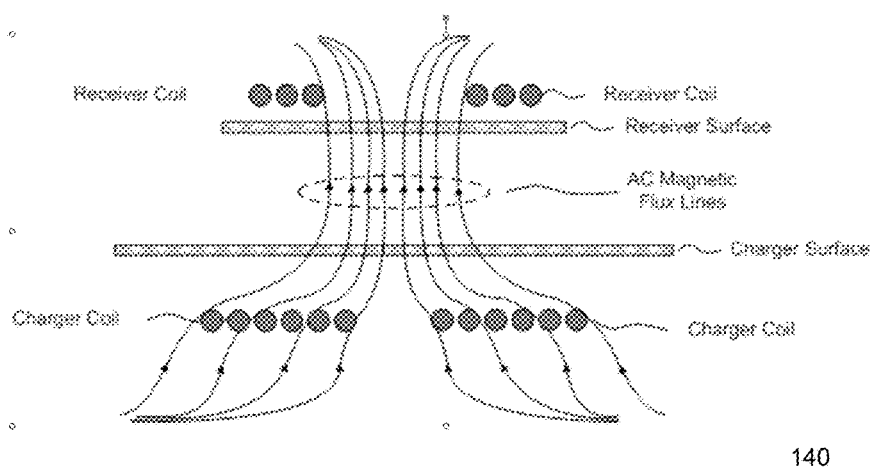
FIG. 4 illustrates an AC magnetic flux generated by a wireless power charger coil, in accordance with an embodiment.

In a variation of the above system, two charger coils (one generating the RF and a high Q power transfer coil) and two receiver coils (one high Q power transfer coil and a receive coil connected to a load) can be used. Systems such as those shown in FIGS. 3 and 4 are often referred to as Magnetic Resonance (MR) systems due to the large gap present between the coils during operation. As described previously however, MR is usually referred to inductive power transfer when the coils are farther apart or of dissimilar size (low coupling coefficient). In a typical MR system developed for EV charging, a large portion of the magnetic field generated between the coils can be leaked to surroundings at coil to coil vertical gap of 20 cm and laterally offset coils. This large amount of radiation in such systems resulting in large electromagnetic interference with adjacent electrical and electronics systems, health concerns and low efficiency is a significant challenge facing wireless power charging of EVs. Some of the drawbacks with these systems include:

1. High lateral (x and y) sensitivity: The amount of power transfer and efficiency of existing Wireless Charging systems is highly position dependent. For charger and receiver coil sizes of 40-50 cm diameter, the alignment accuracy can be a fraction of this size (.+−.10 cm) requiring precise positioning of the vehicle with respect to the charger and/or complex methods for alerting and guiding the driver for precise positioning of the two parts. Three methods of alignment are under consideration by an SAE J2954 standard under consideration for this application:

a. Triangulated RFID Positioning (using multiple RFID tags to triangulate and guide positioning).

b. Magnetic Coupling Positioning (applying a magnetic ping and finding a sweet spot for alignment).

c. Combination Positioning (RFID for initial proximity detection followed by magnetic coupling positioning for sweet spot alignment).

2. Receiver coil placement in the electric vehicle: The lateral sensitivity also causes difficulties in establishing a location for placement of the receiver coil in the vehicle. Due to automobile design differences, it may not be always possible for the manufacturers to agree on a precise location for placement of the receiver coil in all EVs. In that case, if the charger coils are embedded in static conditions such as parking structures or garages or in quasi-dynamic (i.e. charging while briefly stopped such as at a stop sign or traffic signal) situations, alignment of the receiver coils and charger coils cannot be guaranteed for all EVs.

3. Lower efficiencies: In modeling and manufacture of transformers, it is known that to optimize power transfer, low reluctance paths between the primary and secondary windings are essential. The systems such as shown in FIGS. 3 and 4 do not provide a low reluctance path for the return of the magnetic flux lines between the charger and receiver and thus do not provide for a high efficiency system. These additional losses can be high and can lead to power loss, heating, and EMF affecting nearby devices, vehicles and passengers.

4. High spurious Electromagnetic Field (EMF) emission: Magnetic Resonant systems suffer from large EMF emission problems. Even in low power systems designed for 5 W, experimental and modeling work demonstrate that EMF emissions may exceed the Federal Communication Commission (FCC) and safety limits for human exposure by 30-40 dB. The exposure levels at several kW of transmitted power can be proportionally greater, leading to unsafe operation. In EV trials of Magnetic Resonant wireless charging, high amounts of interference with automotive electronics systems have been observed, causing malfunction and lock out of ignition and door lock systems.

The above approach generally requires a driver to guide the vehicle to an optimum alignment position with a high degree of accuracy. In accordance with an embodiment, a system with large alignment tolerance is highly desirable.

In accordance with an embodiment, the system described here addresses the drawbacks with respect to alternative systems for charging of any mobile system such as electric vehicles, buses, trains, robot or transport systems, etc. In accordance with an embodiment, the system enables higher 3-dimensional positioning flexibility, higher power transfer efficiency, and lower unwanted electromagnetic (EM) emissions by incorporating several improvements. These improvements in positioning also allow a vehicle, robot or system to be charged while in motion.

In accordance with an embodiment using field guiding (FG), the return paths of the AC magnetic flux behind (sides opposite to the gap between the coils) the charger and receiver coils are designed and guided to provide a low reluctance path by appropriate design of magnetic layers below the charger coil(s) and above the receiver coil(s). Magnetic layers are extended beyond the charger and receiver coil areas to allow for overlap of the magnetic layers and to allow the returning flux lines to close on themselves, as shown 150 in FIG. 5. Advantages of this method include lower loss, higher efficiencies and lower EMF emissions. Modeling and tests on systems with such flux guides have shown that such a system can result in significantly higher system efficiency.

Figure 5:
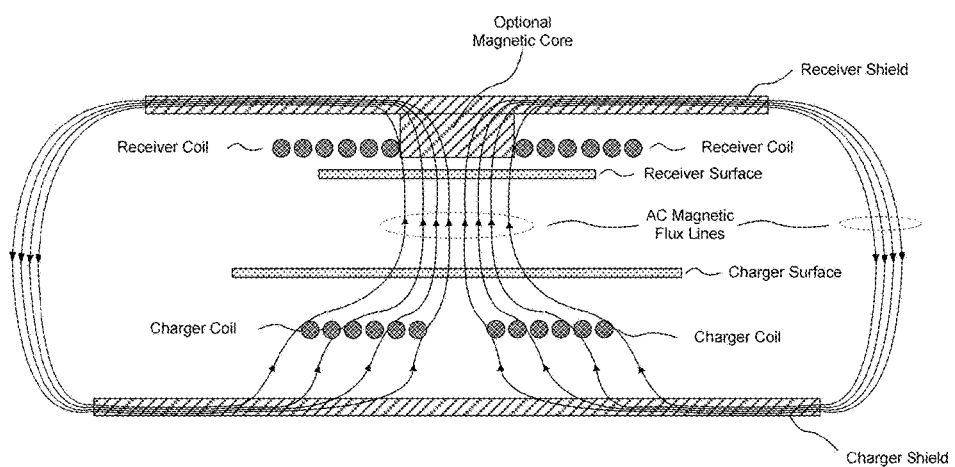
FIG. 5 illustrates the use of magnetic layers that extend beyond the charger and receiver coil areas, in accordance with an embodiment.

In accordance with an embodiment to further facilitate coupling of the magnetic field to the receiver coil(s), the receiver system may incorporate an additional magnetic material in the center of the receiver coil such as shown in FIG. 5. This component may comprise the same or different material that is used behind the receiver coil and its properties may be optimized for its particular use. As an example, solid or flexible Ferrite material with a desirable permeability can be incorporated. The core may only have the thickness of the PCB or Litz wire receiver coil and as such may have thickness of several tenths of millimeter and be of minimal thickness and weight. However incorporation of this core to the receiver coil may affect the receiver coil inductance, and considerably affect the efficiency and power handling capability of the system.

FIG. 5 shows the incorporation of a magnetic core to the central area of a Flux Guide system. In accordance with other embodiments, the magnetic core can be added to the MR, MC, and MA receiver systems described earlier to similarly enhance their performance.

Figure 6:
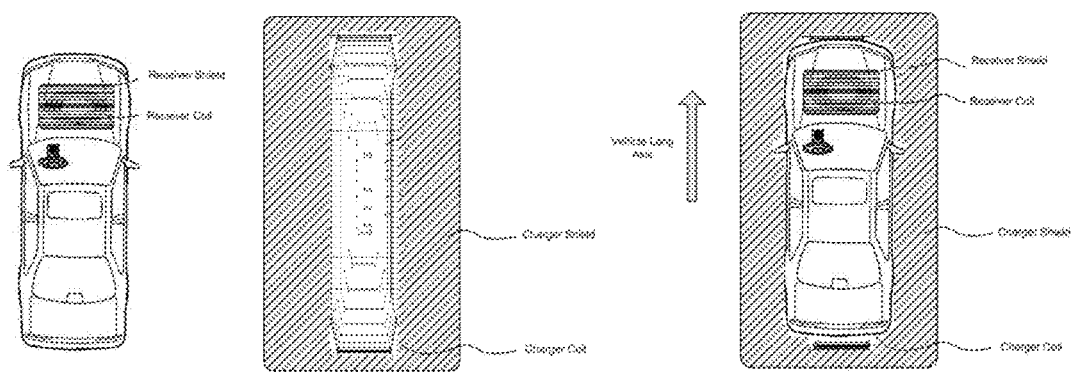
FIG. 6 illustrates a crossed charger and receiver coil and shield geometry, in accordance with an embodiment.

In accordance with an embodiment shown 160 in FIG. 6, by using a crossed charger and receiver coil and shield geometry, overlap of some portion of the charger and receiver coil over a wide range of x (along width of the vehicle) and y (along the length of the vehicle) can be assured allowing large positioning tolerance in the design. The dimensions of the coils can be adjusted according to requirements of positioning tolerance providing a very flexible design platform. This design also provides a low reluctance return path thus providing high efficiency and low unwanted EM emissions.

Additional aspects of various embodiments are described in U.S. Provisional Patent Application No. 61/613,792, filed Mar. 21, 2012, which is herein incorporated by reference.

In accordance with an embodiment, a method is described for containing the EM emission from the charger only to the location where the receiver (attached to the bottom of the vehicle or other system) is in alignment. This is an important factor because otherwise excessive charger emissions may be emitted from other locations of the charger coil into the vehicle and surrounding areas reducing the system efficiency and increasing unwanted EM emissions. In accordance with an embodiment, the technology described herein takes advantage of the nonlinear behavior of magnetic ferrite materials for achieving this. To achieve the desired localization, the charger coil is covered by an appropriate magnetic layer that shields the majority of the charger emissions. By designing the system appropriately, a small amount of the evanescent magnetic field in the surrounding area of the charger coil and the shield can reach the receiver. In the linear regime of operation, the magnetic field strength H is related to the magnetic flux density B through the permeability of the material .mu.

$$B = .mu.H + M$$

Figure 7:
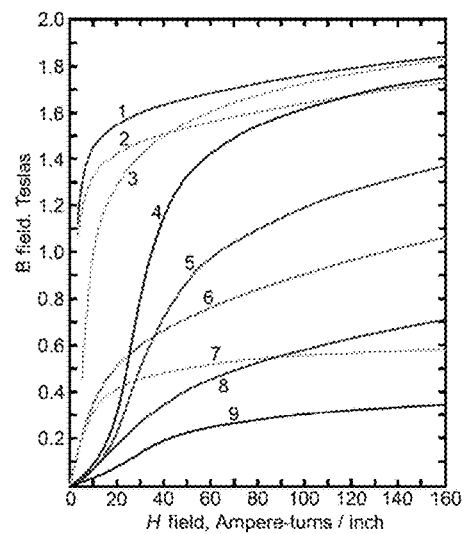
FIG. 7 illustrates permeability of Ferromagnetic materials, in accordance with an embodiment.

In the above equation, M is the magnetization of a material. It must be noted that B, H, and M are vectors and .mu. is a scalar in isotropic materials and a tensor in anisotropic ones. In anisotropic materials, it is therefore possible to affect the magnetic flux in one direction with a magnetic field applied in another direction. The permeability of Ferromagnetic materials is the slope of the curves 170 shown in FIG. 7 and is not constant, but depends on H. In Ferromagnetic or Ferrite materials as shown in FIG. 7, the permeability increases with H to a maximum, then as it approaches saturation it decreases by orders of magnitude toward one, the value of permeability in vacuum or air. Generally, the mechanism for this nonlinearity or saturation is as follows: for a magnetic material including domains, with increasing external magnetic field, the domains align with the direction of the field (for an isotropic material) and create a large magnetic flux density proportional to the permeability times the external magnetic field. As these domains continue to align, beyond a certain value of magnetic field, the domains are all practically aligned and no further increase in alignment is possible reducing the permeability of the material by orders of magnitude closer to values in vacuum or air.

Different materials have different saturation levels. For example, high permeability iron alloys used in transformers reach magnetic saturation at 1.6-2.2 Tesla (T), whereas ferromagnets saturate at 0.2-0.5 T. One of the Metglass amorphous alloys saturates at 1.25 T. The magnetic field (H) required to reach saturation can vary from 100 A/m or lower to 1000's of A/m. Many materials that are typically used in transformer cores include materials described above, soft iron, silicon steel, laminated materials (to reduce eddy currents), silicon alloyed materials, Carbonyl iron, Ferrites, Vitreous metals, alloys of Ni, Mn, Zn, Fe, Co, Gd, and Dy, nano materials, and many other materials in solid or flexible polymer or other matrix that are used in transformers, shielding, or power transfer applications. Some of these materials may be appropriate for applications in various embodiments described herein.

Figure 8:
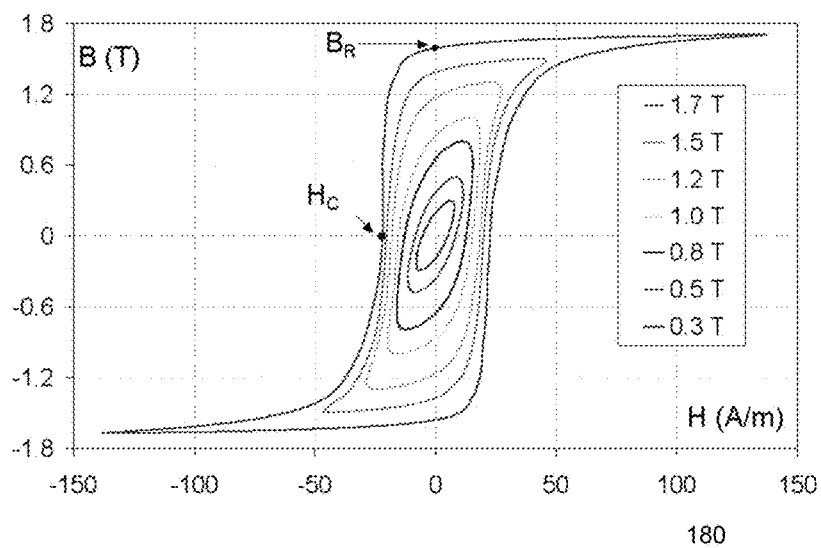
FIG. 8 illustrates a hysteresis curve for a hard ferromagnetic material such as steel, in accordance with an embodiment.

FIG. 8 shows the hysteresis curve 180 for a hard ferromagnetic material such as steel. As the magnetic field is increased, the magnetic flux saturates at some point, therefore no longer following the linear relation above. If the field is then reduced and removed, in some media, some value of B called the remanence (Br) remains, giving rise to a magnetized behavior. By applying an opposite field, the curve can be followed to a region where B is reduced to zero. The level of H at this point is called the coercivity of the material.

Figure 9:
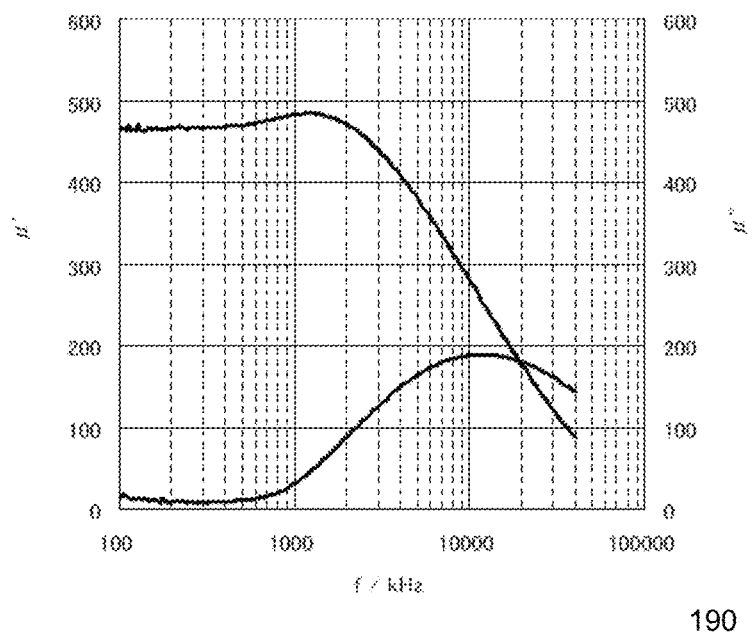
FIG. 9 illustrates real and imaginary parts of the permeability of a ferromagnetic material as a function of applied electromagnetic frequency, in accordance with an embodiment.

Many magnetic shield layers comprise a soft magnetic material made of high permeability ferromagnets or metal alloys such as large crystalline grain structure Permalloy and Mu-metal, or with nanocrystalline grain structure Ferromagnetic metal coatings. These materials do not block the magnetic field, as with electric shielding, but instead draw the field into themselves, providing a path for the magnetic field lines around the shielded volume. The effectiveness of this type of shielding decreases with the decrease of material's permeability, which generally drops off at both very low magnetic field strengths, and also at high field strengths where the material becomes saturated as described above. The permeability of a material is in general a complex number:

$$\mu = \mu' + j\mu''$$

where $\mu'$ and $\mu''$ are the real and imaginary parts of the permeability providing the storage and loss component of the permeability respectively. FIG. 9 shows the real (top curve) and imaginary (lower curve) part of the permeability 190 of a ferromagnetic material as a function of applied Electromagnetic frequency.

Figure 10:
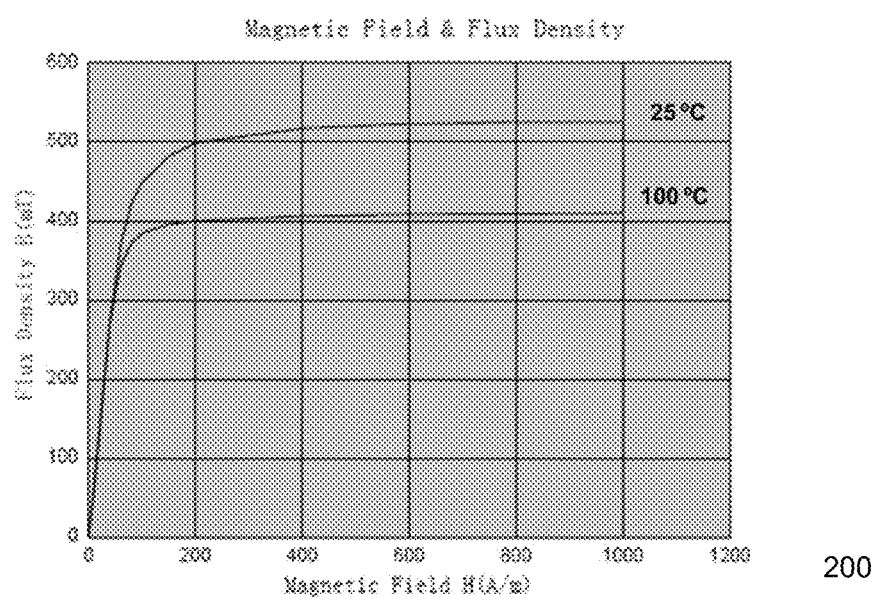
FIG. 10 illustrates magnetization curves of a high permeability proprietary soft magnetic ferrite material, in accordance with an embodiment.

FIG. 10 shows the magnetization curves 200 of a high permeability (real permeability.about.3300) proprietary soft magnetic ferrite material at 25.degree. C. and 100.degree. C. temperature. Increase of temperature results in a reduction in the Saturation Flux density. But at either temperature, saturation of the flux density B with increasing H is clearly observed. A distinct reduction in the slope of B-H curve (i.e. material permeability) is observed at around 100 A/m and the reduction of the permeability increases with H increase until the material permeability approaches 1 at several hundred A/m. This particular material is MnZn based and retains high permeability at up to 1 MHz of applied field frequency but loses its permeability at higher frequencies. Materials for operation at other frequency ranges also exist. In general, MnZn based materials may be used at lower frequency range while NiZn based materials are used at higher frequencies up to several hundred MHz. It is possible with appropriate material engineering and composition to optimize material parameters to obtain the desired real and imaginary permeabilities at any operating frequency and to also achieve the saturation magnetic field and behavior desired.

The permeability of Ferromagnetic materials is the slope of the curves shown in FIG. 10 and is not constant, but depends on H. In Ferromagnetic or Ferrite materials, the permeability increases with H to a maximum, then as it approaches saturation it decreases by orders of magnitude toward one, the value of permeability in vacuum or air.

Figure 11:
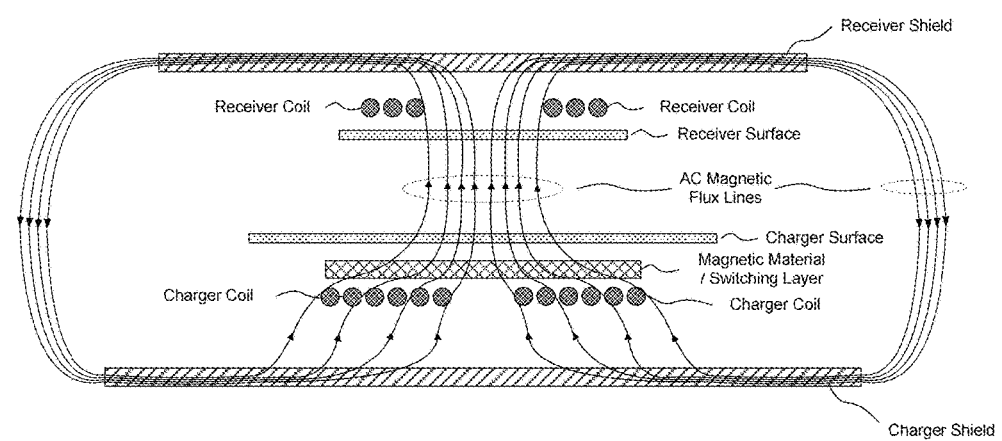
FIG. 11 illustrates a flux guided and magnetic coupling system including a magnetic switching layer, in accordance with an embodiment.

In accordance with an embodiment 210 shown in FIG. 11, the field guided system of FIG. 5 can be modified by adding a magnetic switching layer to the charger at a location above the charger coil. The coils are used in a system as shown in FIG. 2 which shows a high level view of the main components of a wireless charger system, wherein the charger and receiver coils L1 and L2 can be operated in resonance with corresponding capacitors C1 and C2 such that the LC circuit in the charger and receiver are both in resonance at the same frequency. Operating the charger and receiver at this resonance, the magnetic field in the location just in between the charger and receiver coils can build up to much higher levels than the surrounding area due to the Q factor of the resonance of the coils and their respective capacitors and saturate the magnetic layer in this area creating an open magnetic aperture allowing transmission of the magnetic flux and power. This system combines flux guiding (FG) with a Magnetic Coupling (MC) technique, to provide further reduction of emissions from the charger coil at areas where the receiver is not present, and may be advantageous in some applications.

U.S. Provisional Patent Application No. 61/613,792, filed Mar. 21, 2012; U.S. patent application Ser. No. 13/352,096, filed Jan. 17, 2012 (published as U.S. Publication No. 20120235636); and PCT Application No. PCT/US2012/021729, filed Jan. 18, 2012; each of which applications are herein incorporated by reference, describe in further detail various embodiments of this technology and approach.

Tests of mobile wireless charger systems incorporating above technologies have shown that the efficiency of the system can be improved by up to 10% compared to fixed position power transfer between two coils when field guiding (FG) and/or flux guiding and MC techniques described above are used. In addition, the EMF emission is reduced by 40-50 dB over conventional magnetic resonance systems resulting in systems meeting or exceeding regulatory guidelines. In prototypes and systems developed for mobile device charging incorporating this technology, a ratio of 6 or higher y axis tolerance compared to the height of a receiver coil can be obtained with minimal to low loss of efficiencies. For an EV application and a receiver coil of 0.5 m.times.0.5 m dimensions and a charger coil of 0.5 m.times.2 m dimensions positioning tolerance of as much as .+-.0.5 m along the width of the vehicle and .+-.0.1 m along the length of the vehicle may be expected.

An important aspect of any practical wireless charging system development and implementation is the susceptibility of the system to nearby metallic parts. In a conventional magnetic resonant (MR) system, any metal sheet or part placed in between or near the coils during power transfer will absorb electromagnetic radiation during power transfer causing high levels of dangerous heating due to the eddy currents set up by a pulsing magnetic field in a metal (same operating principle as an inductive cooker) especially at frequencies >100 kHz and for ferrous metals. This could result in unsafe operation or safety issues if a metal can or a metal foil or container, keys, coins, etc. is accidentally placed near this area.

In accordance with an embodiment, the build-up of the magnetic field between the coils at a particular location allows opening up the magnetic aperture in that area. Therefore when a metal part is placed in that area, the magnetic field cannot build up and no power transfer occurs. This behavior results in an automatic method for eliminating hot spots due to presence of metal in between the coils and eliminating a very serious and difficult problem in practical use of wireless charging in EV charging.

In accordance with an embodiment, this behavior is confirmed in wireless charging systems developed with Flux Guide and Magnetic Coupling (saturation) that have safer operation in the presence of metallic parts or materials. Advantages of the above approach over conventional MR systems include:

1. Higher system power transfer efficiencies over a range of x and y alignments resulting from optimized magnetic coupling and return flux path over a range of positions.

2. Larger lateral (x and y dimension) position insensitivity and z gap height resulting from the unique crossed coil structure and flux return geometry.

3. Lower unwanted EM emissions resulting in lower Electromagnetic Compatibility issues and human health concerns.

4. Low metal susceptibility.

In accordance with an embodiment, the communication protocol can be one that is specific for the application. For example, in accordance with an embodiment, in the case of charging for electric vehicles, as shown 220 in FIG. 12, the communication between the charger and the receiver may follow a number of protocols including automotive specific procedures or protocols. For example, the main communication and control protocol to be used in the system may be 1-way or 2-way Dedicated Short Range Communications (DSRC) at 5.9 GHz. The system can be initially activated through radio-frequency identification (RFID) or NFC or other recognition or ID systems between the charger and the receiver. Once approach of a vehicle or system or robot or other system to be charger has been detected and verified through such a system, a low power ping (short power application) from the charger can be initiated to energize and power the receiver circuit. Once the receiver is powered and DSRC or other communication and control protocol is established and verified, full charging and power transfer is initiated. The receiver system will not apply the power to the car charging system until the received power is stabilized and various safety and interlock tests have been verified. These can include verification of efficiency, temperature, and foreign object detection tests.

In accordance with an embodiment, in the case that communication is provided through the power transfer coil, one method for the communication is to modulate a load in the receiver to affect the voltage in the receiver coil and therefore create a modulation in the charger coil parameters that can be detected through monitoring of its voltage or current. Other methods can include frequency modulation by combining the received frequency with a local oscillator signal or inductive, capacitive, or resistive modulation of the output of the receiver coil.

In accordance with an embodiment, the communicated information can be the output voltage, current, power, device or battery status, validation ID for receiver, end of charge or various charge status information, receiver battery, device, or coil temperature, and/or user data such as information about the user, verification of ability to account and charge a customer for a charging/power service, etc or provide true data communication that can be used to perform system or firmware updates, diagnostics, etc. The communication can also be a pattern or signal or change in the circuit conditions that are transmitted or occurs to simply notify the presence of the receiver nearby.

Figure 12:
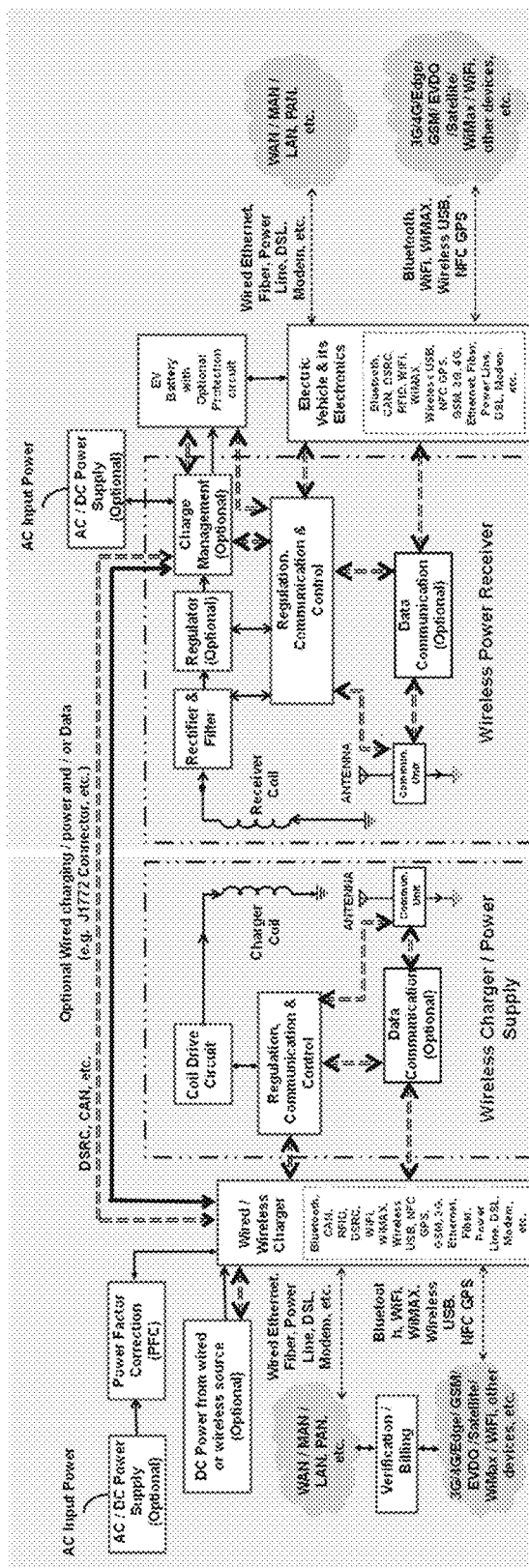
FIG. 12 illustrates a high level block diagram of a wireless power transfer system, in accordance with an embodiment.

In accordance with an embodiment shown in FIG. 12, the data communicated can be any one or more of the information detailed herein, or the difference between these values and the desired value or simple commands to increase or decrease power or simply one or more signals that confirm presence of a receiver or a combination of the above. In addition, the receiver can include other elements such as a DC to DC converter or regulator such as a switching, buck, boost, buck/boost, or linear regulator. The receiver can also include a switch between the DC output of the receiver coil and the rectification and smoothing stage and its output or the output of the regulator stage to a device or battery or a device or system or EV or robot attachment and in cases where the receiver is used to charge a battery or device, the receiver may also include a regulator, battery charge management IC or circuitry and/or battery protection circuit and associated electronics, etc. The receiver may also include variable or switchable reactive components (capacitors and/or inductors) that allow the receiver to change its resonant condition to affect the amount of power delivered to the device, load or battery. The receiver and/or charger and/or their coils can also include elements such as thermistors, magnetic shields or magnetic cores, magnetic sensors, and input voltage filters, etc. for safety and/or emission compliance reasons.

Safety standards with respect to Human exposure to Electromagnetic radiation exist. For example, the International Commission on Non-Ionizing Radiation Protection (ICNIRP) has developed several guidelines covering the acceptable limits of Electromagnetic Fields (EMF) up to 300 GHz (1998) and in the range of 100 kHz-300 GHz (2009). These considerations must be taken into account in design of any practical wireless charging system and appropriate coil and magnetics systems incorporated.

In accordance with an embodiment, the receiver may also be combined with other communication or storage functions such as NFC, WiFi, Bluetooth, etc. In addition, the charger and or receiver can include means to provide more precise alignment between the charger and receiver coils or antennas. These can include visual, physical, or magnetic means to assist the user in alignment of parts. To implement more positioning freedom of the receiver on the charger, the size of the coils can also be mismatched. For example, the charger can comprise a larger coil size and the receiver a smaller one or vice versa, so that the coils do not have to be precisely aligned for power transfer.

In accordance with an embodiment, in simpler architectures, there may be minimal or no communication between the charger and receiver. For example, a charger can be designed to be in a standby power transmitting state, and any receiver in close proximity to it can receive power from the charger. The voltage, power, or current requirements of the device or battery connected to the receiver circuit can be unregulated, or regulated or controlled completely at the receiver or by the device attached to it. In this instance, no regulation or communication between the charger and receiver may be necessary. In accordance with an embodiment, in a variation of this, the charger can be designed to be in a state where a receiver in close proximity can bring it into a state of power transmission. Examples of this include a resonant system where inductive and/or capacitive components are used, so that when a receiver of appropriate design is in proximity to a charger, power is transmitted from the charger to a receiver; but without the presence of a receiver, minimal or no power is transmitted from the charger.

In accordance with an embodiment, in a variation of the above, the charger can periodically be turned on to be driven with a periodic pattern (a ping process) and if a receiver in proximity begins to draw power from it, the charger can detect power being drawn from it and stay in a transmitting state. If no power is drawn during the ping process, the charger can be turned off or placed in a stand-by or hibernation mode to conserve power and turned on and off again periodically to continue seeking a receiver.

In accordance with an embodiment, the power section (coil drive circuit and receiver power section) can be a resonant converter, resonant, full bridge, half bridge, E-class, zero voltage or current switching, flyback, or any other appropriate power supply topology. For example, FIG. 2 described above shows a wireless charger system in accordance with an embodiment, with a resonant converter geometry, wherein a pair of transistors $Q1$ and $Q2$ (such as FETs, MOSFETs, or other types of switch) are driven by a half-bridge driver IC and the voltage is applied to the coil $L1$ through one or more capacitors shown as $C1$. The receiver includes a coil and an optional capacitor (for added efficiency) shown as $C2$ that can be in series or in parallel with the receiver coil $L2$. The charger and/or receiver coils may also include impedance matching circuits and/or appropriate magnetic material layers behind (on the side opposite to the coil surfaces facing each other) them to increase their inductance and/or to shield the magnetic field leakage to surrounding area. The charger and/or receiver may also include impedance matching circuits to optimize/improve power transfer between the charger and receiver.

In many of the embodiments and figures described herein, the resonant capacitor C2 in the receiver is shown in a series architecture. This is intended only as a representative illustration, and in accordance with other embodiments, this capacitor can be used in series or parallel with the receiver coil. Similarly, the charger is generally shown in an architecture where the resonant capacitor is in series with the coil. In accordance with an embodiment, system architectures with the capacitor C1 is in parallel with the charger coil are also possible.

In accordance with an embodiment, such as that shown in FIG. 12, the charger section can be powered by an AC power source such as from a power outlet or available grid power. This AC voltage can be rectified before application to the wireless charger power section. In addition, to maximize the efficiency of the system, a Power Factor Correction (PFC) system or network can also be implemented. Furthermore, the charger can be designed such that in addition to wireless charging, it may provide optional wired charging and communication to the system, robot or vehicle to be charged. As an example, wired charging of an EV may follow existing connector and communication standards such as ASE J1772 Standard.

In accordance with an embodiment, the charger also includes a circuit that measures the current through and/or voltage across the charger coil. In accordance with embodiments or systems whereby the communication occurs through the power transmission coils (similar to shown in FIG. 1), various methods for detection of the communication signal on the charger current or voltage are available. This demodulation and detection mechanism can be, for example, an AM or FM receiver (depending on whether amplitude or frequency modulation is employed in the receiver modulator) similar to a radio receiver tuned to the frequency of the communication or a heterodyne detector, etc. In accordance with an embodiment, once the charger MCU has received a signal through wired or wireless communication and decoded it, the MCU can take action to provide more or less power to the charger coil. This can be accomplished through known methods of adjusting the frequency, duty cycle or input voltage to the charger coil or a combination of these approaches. Depending on the system and the circuit used, the MCU can directly adjust the bridge driver, or an additional circuit such as a frequency oscillator may be used to drive the bridge driver or the FETs.

In accordance with an embodiment, the microcontroller unit (MCU) in the charger (MCU1) is responsible for understanding the communication signal from the detection/demodulation circuit and, depending on the algorithm used, making appropriate adjustments to the charger coil drive circuitry to achieve the desired output voltage, current or power from the receiver output. In addition, MCU1 is responsible for processes such as periodic start of the charger to seek a receiver at the start of charge, keeping the charger on when a receiver is found and accepted as a valid receiver, continuing to apply power and making necessary adjustments, and/or monitoring temperature or other environmental factors, providing audio or visual indications to the user on the status of charging or power process, etc. or terminating charging or application of power due to end of charge or customer preference or over temperature, over current, over voltage, or some other fault condition or to launch or start another program or process.

For example, in the case of EV charging described above, when the vehicle is being charged wirelessly, communication between the wireless power receiver and/or the battery or its charging circuit and the EV can be performed by one or a number of the on-board diagnostic (OBD) or other protocols such as Controller Area Network (CAN) incorporated into the vehicle's communication system. In accordance with an embodiment, such communication can communicate with the EV and/or the battery and/or its charging circuit can provide detailed info on the battery's state of charge, its temperature, required current/voltage or its state of health. In addition, initiation of wireless charging can be signaled to the vehicle to provide visual and/or auditory signal to the user, disable the vehicle movement during charge, or other actions. The signaling to the user can also be provided remotely. For example the vehicle and/or the charger or the receiver can provide remote information on progress of charging or any faults or errors to a driver or designated person who may be outside the vehicle at home, office, restaurant, etc. through a WiFi, GSM, 3G, 4G, Bluetooth, etc. network by sending real time information to a handheld or portable device or computer such as a phone, laptop, tablet, desktop computer, TV, etc by email, text, phone calls, fax, custom application (app) or other communication mechanisms. For example a driver can be alerted that the EV battery has reached full charge or how many miles of driving can be expected from the current state of charge in real time as the charging progresses. In accordance with an embodiment, the charger and/or the receiver or the vehicle can also be programmed to contact utility service providers and depending on the electricity rate at any given time or the load of the electrical network, etc., optimize the charge commencement and/or termination time or charge rate for optimum network load, minimum electricity cost, or other desirable performance attributes.

In accordance with an embodiment, the charger system and/or the EV to be charged can be connected by land or wireless connections to a system for verification and billing/tolling of the electricity used during charging in public locations such as public or office parking, hotel, restaurant, roadways, structures, etc. To identify an EV, systems such as RFID, NFC, etc. can be used and once an EV is parked or placed in the vicinity of a wireless charger even while moving, it can be recognized and the EV user or responsible party can be charged or billed through a pre-registered or such payment system for the amount of electricity used during EV charging.

In accordance with an embodiment, as shown in FIG. 12, the communication between the charger and receiver for EV charging can be implemented with a separate RF channel. An example of this channel is the Dedicated Short Range Communication (DSRC) one way or two way communication which is used for in-vehicle or between-vehicle communication at 5.9 GHz band. Examples of its use are in toll collection, Cooperative Adaptive Cruise Control, Collision Warning, etc.

In accordance with an embodiment, to recognize arrival or proximity of a valid EV for charging or to aid in alignment within required tolerances for valid charging, use of RFID or NFC, Bluetooth, or other wireless detection between the charger and receiver/vehicle can be used to indicate approach of a valid vehicle. This can be followed by more precise triangulation techniques using multiple detectors to guide the EV operator to bring the EV to better alignment. For example, 2, 3 or 4 detectors located in a triangular or square pattern in or on the charger and correspondingly placed tags on the EV can be used to provide the EV operator info on the alignment based on strength of signals. Conversely, the tags can be placed on or in the charger and the detectors can be in the EV.

In accordance with an embodiment, once a rough or approximate alignment is reached a wireless communication link between the charger and receiver and the battery and its charging system can be established and diagnostic tests performed. The charger can further then test the availability and operation of a receiver on the EV by sending a burst of power (ping signal) to power the receiver system in the EV. Initially the receiver can then perform a thorough self-test of its operations and the battery and its charging system, temperature, etc. before requesting the appropriate power and commencing charging or connecting to the charger system to provide power.

In accordance with another embodiment, an initial recognition and identification of an approaching and aligned device can be performed by RFID or similar methods, wherein the charger may send out a burst of power (ping) to power the receiver, which in turn would power the receiver communication module and initiate further identification and communication for power transfer. In accordance with this embodiment, the receiver is fully or almost fully powered by the charger, and therefore a vehicle with no battery charge can also be powered since all the power for identification, communication and control is provided by the charger.

While the description above has described situations where a vehicle, robot, train, bus, etc. is being moved to the vicinity of a charger or power supply to receive power during parking or a stationary charging condition, in accordance with another embodiment, one or several chargers can be placed in one or more locations along the path of a mobile vehicle, train other transport device or vehicle or robot such that, during temporary stoppage or slow down, it can receive power. Examples of such implementation can include an Electric Vehicle stopping at a red light or traffic stop or a robot stopping at set positions during performance of tasks and receiving power before moving on. In such embodiments, sensors such as described above can signal the presence of a receiver nearby and initiate further identification of the receiver or receivers and transfer of power. In addition to such quasi-static wireless charging, it may be advantageous to provide charging or power continuously during the movement of a receiver. An example can include a train moving along a set track and receiving power continuously or an embodiment where a series of continuous or discontinuous chargers are embedded in a road, and an Electric Vehicle can be charged or powered while being driven on the road.

Figure 13:
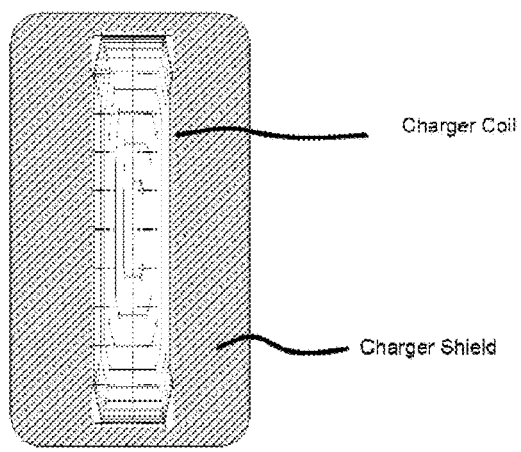
FIG. 13 illustrates use of one or more chargers and/or coils that cover a length of road, path or train track, in accordance with an embodiment.
Figure 13:
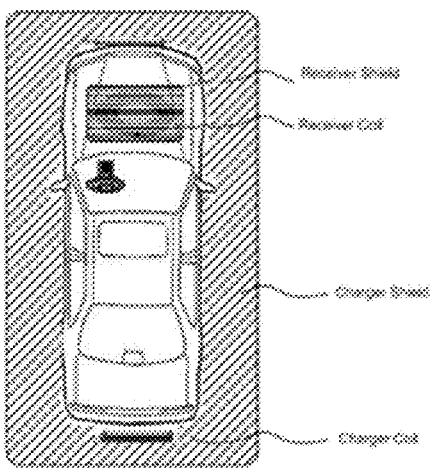
Figure 13:
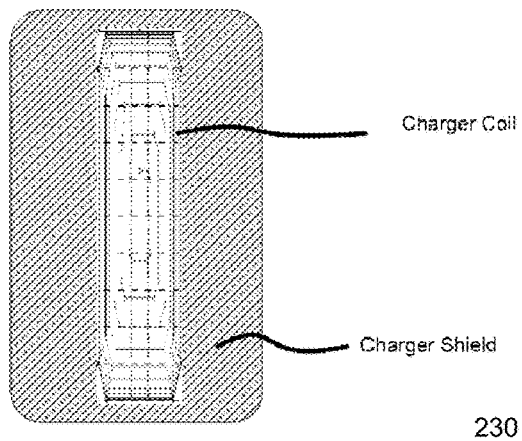

In accordance with an embodiment such as that shown 230 in FIG. 13, the charger can be continuous or built from one or more chargers and/or coils that each cover a set length or majority of the length of the road, path or train track. Approach of a vehicle, train, robot, etc. is signaled in a manner similar to described above and the charging or power application is performed while the vehicle or train, robot, etc. is in the vicinity of each segment before being disconnected when it moves to the next segment.

To provide safe charging performance, it may be necessary during the charging to compare the power transferred to the power received and/or available for charging. This can be performed by charger and/or receiver. If these power levels indicate a large discrepancy from expected values and the efficiency of power transfer in the system, this may indicate the presence of a metal or other anomaly in the system requiring a warning or shut down or other actions to be taken. Such safety interlocks can be implemented and activated by the charger, receiver or both systems.

While many of the techniques described herein improve efficiency and alignment insensitivity, decrease unwanted EM emission and performance of the systems would improve the safety and benefits of the system, they can be combined with such methods described above for alignment, verification and safety of the system to provide even more secure performance or to provide additional features to the user. In another embodiment of the system, the charger and/or receiver, system, robot or EV to be charged may include systems for measurements of stray or spurious EM emission at one or more locations and may take action to keep this emission to acceptable levels. The range of action to be taken can include shutdown of the system, adjustment of power to lower levels, instructing the operator or driver to move the receiver or the system, robot, or EV to be charged to a location to reduce unwanted EM emission, etc. or a combination of such actions.

An area of concern for EV charging is that during charging, small animals such as dogs and cats or other pets or children or humans may move in between the coils or other high magnetic field areas and be exposed to EM emissions. Since the EM field profile is largely impervious to the presence of tissue, bones, etc. such presence may not be detected by comparing the received power to expected power levels. In accordance with an embodiment shown in FIG. 12 and described above, to avoid charging or power transfer in the presence of such living tissue, the charger and/or receiver or the system to be charged, robot, or EV may incorporate a proximity sensor to sense such presence. Examples of potential such sensors are capacitive, Doppler, resistive, laser or diode or rangefinder, optical, thermal, photocell, radar, sonar, ultrasonic, weight etc. methods of detection that can be used. In another embodiment one or more visible wavelength range cameras or infrared detectors, monitors or cameras monitor the space between the coils and any anomalies or movement in this area is used to terminate charging or take other actions such as to issue a warning, shut down charging, etc.

In accordance with an embodiment, the system shown in FIG. 12 can be used with a robot or EV and/or their battery in communication that is being powered and/or charged. The charger and/or the system, robot or EV can itself be connected to a Personal Area Network (PAN), Local Area Network (LAN), Wide Area Network (WAN), Metropolitan Area Network (MAN), Satellite, or cellular networks (3G, 4G, GSM, Edge, etc.) or specific navigation or other networks through wired methods, wireless methods, fiber optics, DSL, WiMAX, WiFi, dial up modem, etc. Also the host and the mobile device can communicate through a variety of wired or wireless methods such as USB, Bluetooth, WiFi, WiMAX, Wireless USB, DSRC, CAN, NFC, RFID, etc. The communication and power transfer for charging and/or powering of the system, robot or EV to be charged or powered and/or the charger can be wired (through a wired charger and communication path or such) or wireless (through induction, conduction, magnetic resonance techniques, microwave, optical, solar cells, etc.). In FIG. 12, only a subset of potential protocols and methods for connectivity and communication and charging/power have been shown but, in accordance with various embodiment, other protocols and methods, including specific protocols for control of devices in the home and/or car or other specific situations, can be used.

In accordance with an embodiment, a system such as that shown in FIG. 12 for example, comprises the power paths and power control signals shown in solid lines. Data lines are in dashed lines. Double dashed lines represent connections that can be data or charger and/or power supply signals. The charger and/or power supply comprises a drive circuit for exciting the charger coil. This can be a field effect transistor (FET) or other transistor for generating the alternating current to drive the coil. The regulation/communication and control section is responsible for controlling the frequency/pulse duration, or other characteristics of the drive to control the transferred power or to communicate a signal or data to the receiver. In addition, the circuit can contain a sense circuit that is used to sense the proximity of the receiver and/or as a component for data or signal transfer between the charger and/or power supply and the receiver.

In accordance with an embodiment, in a general geometry such as that shown in FIG. 12, the regulation/communication & control portion or a separate circuit can also provide a communication channel for data to and from a charger or home or office or other device where the charger/power supply is located or is connected to or nearby. By being near each other, we mean that 2 devices are within a distance such that they can interact through a wireless, wired, optical, or other method or protocol within a Personal Area Network (PAN) or Local Area Network (LAN). The mobile device and/or the charger can contain additional communication systems such as Bluetooth, WiFi, WiMAX, GSM, 3G, 4G, Wireless USB, Zigbee, NFC, RFID, GPS, or wired communications such as USB, Ethernet, DSL, Modem, Fiber optics, Optical, HDMI, Power Line Communication (PLC), or other protocols for communications and control between devices and internet or systems such as in the house, car, etc. The charging and/or power for the system, robot or EV can be through induction, conduction, resonant magnetic power transfer, optical power, etc. and/or traditional wired technologies.

In accordance with various embodiments, data can be the control and communication signals necessary for the charging or power transfer process but it may also involve communication, information or file or signals that are exchanged that are not necessarily directly involved in the charging/power supply operation. Examples of information being exchanged between components for charging/power supply function is receiver voltage, current, voltage, any fault condition (over-temperature, over-voltage), end of charge or other charger signals (CS). Examples of application data (AD) can be name, address, phone number, or calendar information, verification or ID or billing information or application/update files. In addition, data can be information related to amount of charge in a battery, presence of a mobile system, robot or EV on a charger, type of device or battery being charged, information about the user and their preferences, location or status of the device or battery being charged, etc. In FIG. 12, the application data (AD) lines have been shown in dotted line while the solid lines represent connections for charging function. Some connections such as the one from the sense circuit to the regulation, communication and control can be for application data or charging signal depending on whether any data exchange is implemented or the sense circuit is strictly used for charger and/or power supply (CS) functions. Similarly, for example, the connection from the device or system or robot or EV being charged to the regulation, communication, and control circuit in the receiver can be either for data (AD) or charger and/or power supply signal (CS). These signals are shown with double dotted lines in FIG. 12. The breakdown between CS and AD shown is as an example and many other situations where the signals may be interpreted as belonging to either group or both may occur.

In accordance with an embodiment, such as that shown in FIG. 12, a general schematic which can include bi-directional data and CS transfer is shown. However, the flow of information can be uni-directional as well. In this case, for example, if the CS and data is from receiver to charger and/or power supply, only a sense circuit in the charger and/or power supply may be implemented. In the block diagram shown in FIG. 12, the data from the charger and/or power supply to the receiver may also be transferred by low or high frequency modulation of the amplitude of the power signal (the drive signal for power transfer) or frequency modulation and filtering or synching in the receiver. These techniques are often used in communication circuits and can be applied herein, in accordance with an embodiment.

In accordance with an embodiment, AD or CS information can be transferred from receiver to charger and/or power supply by techniques such as modulating the load impedance of the receiver, or other techniques, as described for example in U.S. patent application titled "SYSTEM AND METHOD FOR INDUCTIVE CHARGING OF PORTABLE DEVICES", application Ser. No. 12/116,876, filed May 7, 2008, (published as U.S. Patent Publication No. 20090096413), which is incorporated by reference herein. In this way, any AD or CS in the receiver appears as a change in the load of the charger and/or power supply output and can be sensed by the charger and/or power supply sense circuitry. The data exchanged between the charger and/or power supply and the receiver can be exchanged in analog or digital format and many options for this exchange exist.

In accordance with other embodiments, it is possible to have the data and/or charge signal data transferred through another mechanism separate from the power signal. In accordance with an embodiment, such as that shown in FIG. 12, a wireless channel for data and CS is shown where the wireless channel can be a dedicated special channel between the charger and/or power supply and the receiver or can be based on an existing protocol such as Bluetooth, WiFi, WiMAX, Wireless USB, Zigbee, NFC, DSRC, CAN, etc. or a custom or proprietary protocol.

It can be readily appreciated that in the above descriptions many geometries and systems have been described. In practice, one or several of these systems can be used in combination in a charger and/or receivers to provide the desired performance and benefits.

The above description and embodiments are not intended to be exhaustive, and are instead intended to only show some examples of the rich and varied products and technologies that can be envisioned and realized by various embodiments of the invention. It will be evident to persons skilled in the art that these and other embodiments can be combined to produce combinations of above techniques, to provide useful effects and products.

Some aspects of the present invention can be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magnetooptical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claim is:

1. A system for charging of one or more devices, including robots, vehicles, or batteries, the system comprising: a wireless charger that comprises a charger coil, an optional receiver that includes a receiver coil, and an optional wired charger, for charging one or more devices, including robots, vehicles, or batteries, the wireless charger and the optional wired charger using respectively wireless and wired means of communication with the devices to initial and control a charging process, wherein the wireless and the wired charger and/or the device can communicate with a local area, wide area, cellular, satellite, fiber, DSL or other wireless or wired network, to exchange information remotely regarding the charging of the one or more devices.

2. The system of claim 1, wherein the charger coil and the receiver coil and magnetic axes are crossed to provide overlap of some portion of the charger coil and the receiver coil and the magnetic axes over a wide range of x and y axes, allowing for a degree of positioning tolerance.

3. The system of claim 1, wherein an electromagnetic emission from the charger coil is generally contained to a location where the receiver coil is in alignment with.

4. The system of claim 1, wherein wireless communication between the wireless charger and the devices uses Near Field Communication, Bluetooth, WiFi, wireless USB, Felica, Zigbee, Wireless Gigabit, DSRC, RFID, WPC, or other custom communication technology.

5. The system of claim 1, wherein the system performs transferring power to allow charging of a moving device, including use of one or more charger coils along a length upon which the moving device to be powered or to be charged can move.

6. The system of claim 1, wherein a magnetic field build-up between the charger coil and the receiver coil at any particular location allows a change in properties of a magnetic material to allow more efficient of power transfer from the charger coil to the receiver coils.

7. The system of claim 1, wherein the wireless charger performs transferring power to the one or more devices being charged at a variety of positions by the charger coil.

8. The system of claim 1, wherein the devices comprising one or more of a mobile, electronic, electric, lighting, battery, power tool, drone, kitchen, military, medical, industrial tools or other device.

9. The system of claim 1, wherein the devices comprising one or more electric vehicle, robot, train, bus, truck, electric bicycle, motorcycle, Segway type of device and/or other electric vehicles or other moving equipment.

10. The system of claim 1, wherein a communication between the charger coil and the receiver coil can follow one or a number of protocols, including in the case of an electric vehicle including a wireless charging specific or automotive-specific procedures or protocols including DSRC.

11. The system of claim 1, wherein approaching a device having a receiver, including a vehicle or system or robot to be charged, has been detected and verified through a communication such as RFID, Bluetooth, WiFi, Wireless USB, NFC, Felica, Zigbee, Wireless Gigabit (WiGig), WPC, A4WP, DSRC, or a ping or other communication is communicated from the charger coil to energize and power a wireless receiver circuit in the device.

12. The system of claim 1, wherein the charger and the device can communicate information including one or more output voltage, current, power, device or battery status, validation ID for a device, end of charge or various charge status information, and/or user data comprising information about a user, verification of ability to account and charge a customer for a charging/power service, or other data that can be used to perform system or firmware updates, diagnostics, billing or other tasks.

13. The system of claim 1, wherein initiation of wireless charging can be signaled to a device included in a vehicle by providing a visual signal and/or an auditory signal to a user thereby disabling the device or vehicle movement during charge, or other actions.

14. The system of claim 1, wherein initiation of charging of the device included in a vehicle or the vehicle itself can include billing/tolling of the electricity used during charging in public locations including public or office parking garage/lots, hotel, restaurant, roadway or other structures.

15. The system of claim 1 wherein the charger, a device or a vehicle communicates with an owner of the vehicle or a designated person by text, email, telephone message, custom application or other means of communication about a state of charging of the device or the vehicle, error conditions or other important information.

16. The system of claim 1, wherein the charger, device, or vehicle being charged can also be programmed to contact utility service providers and optimize a charge commencement time and/or a termination time or a charge rate for an optimum network load, a minimum electricity cost or other desirable performance attributes.

17. The system of claim 1, wherein once a rough or approximate alignment is reached between the charger and the one or more devices a wireless communication link between the charger and the one or more devices can be established and diagnostic tests, verifications or other actions performed.

18. The system of claim 1, wherein a proximity sensor including a capacitive, resistive, laser or diode or rangefinder, optical, thermal, photocell, radar, sonar, ultrasonic, weight or cameras or infrared sensors or other method of detection can be used to determine a presence of a live animal or a person in a region of high magnetic field close to the charger coil or between the charger coil and receiver coil in the one or more devices and take an appropriate action.

19. A method for wireless and/or optionally wired charging of one or more devices, including robots, vehicles or batteries, the method comprising the steps of: providing a wireless charger including a charger coil, an optional receiver including a receiver coil and an optional wired charger, for charging one or more devices, including robots vehicles, or batteries, the wireless charger and the optional wired charger using respectively wireless and wired means of communication with the devices to initial and control a charging process,
   wherein the wireless and the wired charger and/or the device can communicate with a local area, wide area, cellular, satellite, fiber, DSL or other wireless or wired network, to exchange information remotely regarding the charging of the one or more devices.

\* \* \* \* \*